United States Patent [19]

Cherney

[11] Patent Number: 5,715,736
[45] Date of Patent: Feb. 10, 1998

[54] HAND HELD FOOD HOLDING DEVICE

[75] Inventor: Robert Cherney, Minneapolis, Minn.

[73] Assignee: Chernz, LLC, Minneapolis, Minn.

[21] Appl. No.: 666,879

[22] Filed: Jun. 25, 1996

[51] Int. Cl.$^6$ ............................................. B26D 7/01
[52] U.S. Cl. ............................ 83/13; 83/870; 83/762; 269/3
[58] Field of Search ...................... 83/13, 870, 762, 83/932, 167; 269/1, 3, 295, 909

[56] References Cited

U.S. PATENT DOCUMENTS

| | | | |
|---|---|---|---|
| D. 277,066 | 1/1985 | Levine | D7/673 |
| D. 330,315 | 10/1992 | Shved | D7/673 |
| D. 343,770 | 2/1994 | McFarling et al. | D7/673 |
| D. 354,203 | 1/1995 | Naccarato | D7/673 |
| 1,470,783 | 10/1923 | Vincent | 83/762 |
| 2,089,980 | 8/1937 | Owen | 83/762 |
| 2,219,413 | 10/1940 | Dellar | 269/3 |
| 3,010,500 | 11/1961 | Jordan | 269/3 |
| 3,347,296 | 10/1967 | Rothman | 146/216 |
| 3,583,026 | 6/1971 | Peoni | 17/76 |
| 4,059,870 | 11/1977 | Finkelman | 17/75 |
| 4,341,376 | 7/1982 | Germinario | 269/288 |
| 4,546,686 | 10/1985 | Losiowski et al. | 83/874 |
| 4,807,505 | 2/1989 | Campbell et al. | 83/454 |
| 4,948,106 | 8/1990 | Popeil et al. | 269/87.2 |
| 5,228,668 | 7/1993 | Guyer | 269/87.2 |
| 5,481,953 | 1/1996 | McLeod | 83/762 |

FOREIGN PATENT DOCUMENTS

| | | | |
|---|---|---|---|
| 31601 | 12/1884 | Germany | 269/3 |
| 3347874 | 7/1985 | Germany | 83/762 |
| 237369 | 7/1925 | United Kingdom | 269/3 |
| 269830 | 4/1927 | United Kingdom | 269/3 |
| 620716 | 3/1949 | United Kingdom | 269/3 |
| 831993 | 4/1960 | United Kingdom | 269/3 |

*Primary Examiner*—Maurina T. Rachuba
*Attorney, Agent, or Firm*—Kinney & Lange, P.A.

[57] ABSTRACT

A hand held food holding device to secure articles of food for cutting or slicing which includes a base, a first wall, and a second wall. The first and second walls being connected to the base and extending upward therefrom to create a U-shaped member able to receive and secure articles of food while they are cut or sliced.

25 Claims, 7 Drawing Sheets

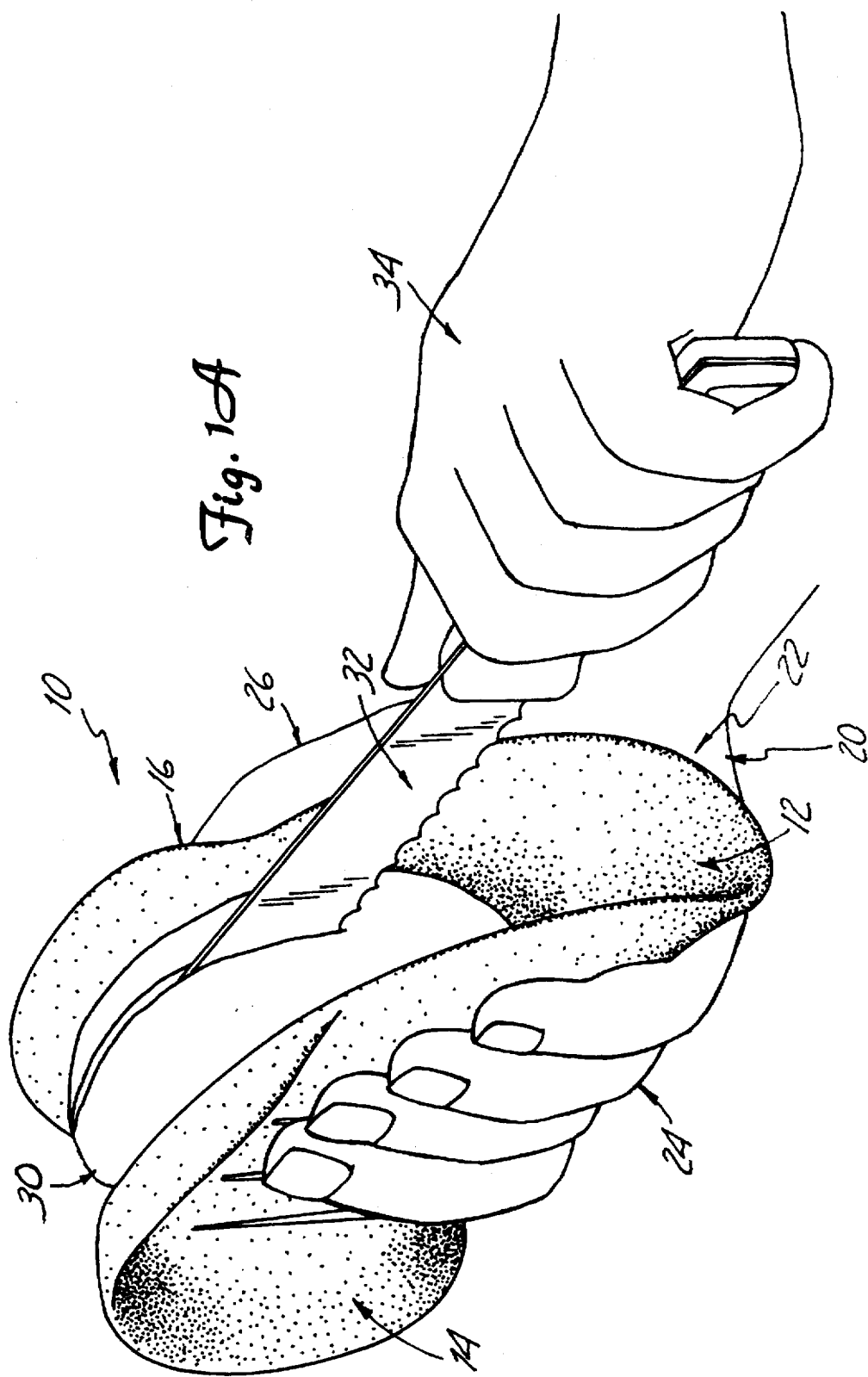

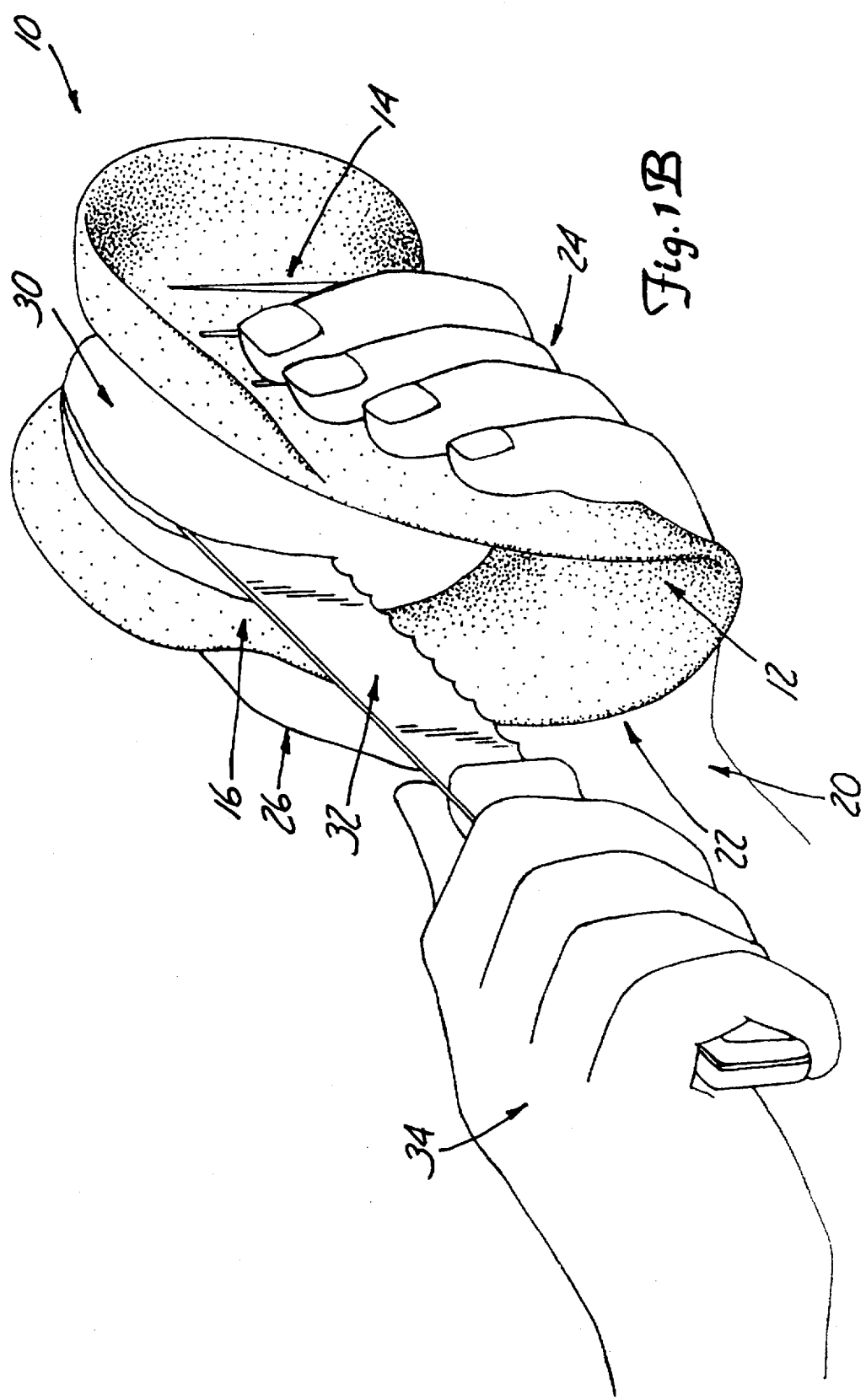

HAND HELD FOOD HOLDING DEVICE

BACKGROUND OF THE INVENTION

The present invention pertains to safely cutting or slicing articles of food. More particularly, it pertains to a hand held food holding device.

When serving various types of food, it is often desirable to cut or slice them into symmetrical halves or various sizes or pieces. However, an individual using a knife to cut or slice an article of food faces a significant safety risk that they may puncture or cut themselves. This risk is further heightened when attempting to cut or slice certain articles of food, such as a bagel. Holding the bagel in one hand while safely, accurately and quickly cutting the bagel with a knife held in the other hand is more difficult than other types of food because of the bagel's relative hard outer crust, dense inner mass and relative narrow width. This is a long-recognized problem spawning the development of numerous devices that attempt to securely hold the bagel while allowing it to be sliced without injury to the person doing the cutting.

These known devices have a common feature of being placed on top of a support means such as a counter or table. From this common characteristic, the known devices can be further delineated into two general categories. The first general category is a jig type device while the second general category hinges two plates together with a cavity therebetween.

The first general category incorporates some type of a jig device which sits on top of a level surface and has a cavity between a pair of sides to hold the bagel or article of food in place during the actual cutting. A slit or opening on both ends of the jig allows a knife to bisect or pass through the cavity and hence through the article of food placed in the cavity. The slit generally continues down to the base of the cavity to allow for a complete cut through the article of food. These types of devices are disclosed in U.S. Pat. No. Des. 330,315; U.S. Pat. Nos. Des. 343,770; U.S. Pat. No. Des. 354,203; U.S. Pat. No. Des. 277,066; 3,583,026; 4,341,376; 4,807,505; 4,948,106; and 5,481,953.

These devices are rigid in construction and require the user to secure the device in place on top of a level surface such as a counter or table during the cutting motion. They also generally rely on pressure from the knife blade along the cutting plane to cut through the article of food resulting in compression of the article of food. U.S. Pat. No. 5,481,953 attempts to overcome the problem of compressing the article of food during the cutting motion by attaching one side of the device to the base with a thin rectangular-shaped piece of resilient material, such as nylon. This allows some flexibility to one of the sides which can then be used to compress the article of food between the two sides. This devise, however, is similar to the other jig style devices in that they are all constructed from rigid material making them bulky in size and requiring a relatively large amount of storage space. The mentioned features of the known jig devices make them cumbersome to work with and not readily portable.

The second general category of device incorporates two plates which are hinged together. Various types of this design are disclosed in U.S. Pat. Nos. 3,347,296; 4,546,686; and 5,228,668. These devices form a cavity which captures the article of food between two hinged plates when the plates are brought together. Similar to the jig type devices, they also provide a slit along the cutting axis to allow a knife to pass between the two plates and cut the article of food. As with the jig type devices, the known hinged plate devices utilize a counter or table for support while the cut is being made. These devices are heavy and bulky to operate and require significant storage space. They are therefore not readily portable.

SUMMARY OF THE INVENTION

The present invention overcomes the above-mentioned disadvantages while providing a food holding device of simple design and construction. The invention discloses a device which allows a user to safely cut an article of food with a knife when the article of food is held in a hand of the user. The hand held device holds the article of food between two opposed facing walls which are secured to a base. Each of the opposed facing walls has an inner and an outer surface. In a preferred embodiment, a unitary piece of flexible resilient material forms the two opposed facing walls and base.

The base rests in a palm of the user's hand and protects the hand from being cut by the knife. Fingers of the user's hand wrap around the outer surface of the first wall, while a thumb of the user's hand wraps around the outer surface of the second wall. The user is then able to secure the article of food by exerting lateral pressure on the device during the cutting motion. The lateral pressure is possible due to the device being constructed from a flexible resilient material. The material composition further results in a portable lightweight flexible device which is easy to use, maintain and store. Additionally, because the device is hand held, it does not have to be placed on a flat level surface such as a counter or table for operation.

The device further incorporates a flange or a lip substantially around its outer edge to protect the user's hand from being cut by the knife. The flange and the lip also allow the user to hold the device more securely.

In a preferred embodiment, the device incorporates raised ribs along the inner surface of the two opposed facing walls to more securely hold the article of food in place during the cutting motion. Opposite the ribs, depressions are located on the outer surface of the two opposed facing walls which afford a more secure grasp of the device by the user.

BRIEF DESCRIPTION OF THE DRAWINGS

FIG. 1A is a perspective view showing a first embodiment of the hand held food holding device of the present invention used in a left-handed cutting configuration.

FIG. 1B is a perspective view showing a first embodiment of the hand held food holding device of the present invention used in a right-handed cutting configuration.

DETAILED DESCRIPTION OF THE PREFERRED EMBODIMENTS

Figure 2:
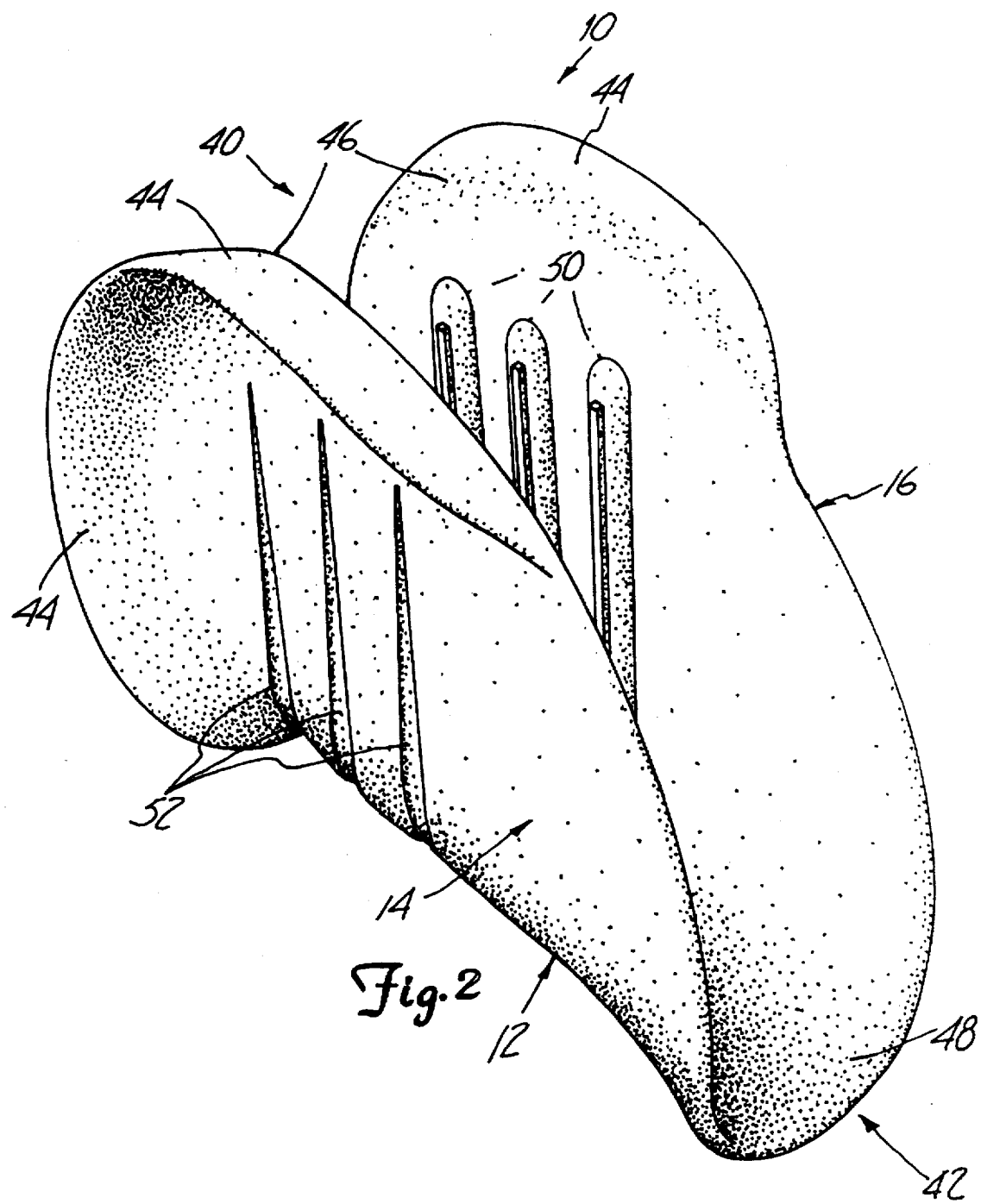
FIG. 2 is a perspective view of the hand held food holding device of FIG. 1.

In FIGS. 1A and 1B, a preferred embodiment of the hand held food holding device 10 is shown in use. FIG. 1A illustrates use of the device in a left-handed cutting configuration and FIG. 1B illustrates use of the device in a right-handed cutting configuration. The device can be used in either configuration due to its symmetry from side to side.

The hand held food holding device 10 includes a base 12, a first wall 14, and a second wall 16. The first and second walls 14 and 16 are connected to, and extend upwardly from, the base 12 to form a U-shaped member. The U-shaped member defining the hand held food holding device 10 rests comfortably in a hand 20 of a user. The base 12 sits in a palm 22 of the user's hand 20, while fingers 24 of the hand 20 wrap around wall 14 and a thumb 26 of the hand 20 wraps around wall 16. This enables an article of food, such as a bagel 30, to be placed within the U-shaped member of the hand held food holding device 10, allowing the user to safely cut the bagel 30 which is held in the hand 20 with a knife 32 that is held in an opposite hand 34.

In a preferred embodiment, a single piece of flexible resilient material comprises the hand held food holding device 10. The material is of a sufficient thickness and resiliency so that the base 12 protects the user's palm 22 from being cut by the knife 32 when cutting the article of food such as the bagel 30. In a preferred embodiment, the hand held food holding device 10 has a generally uniform thickness of approximately ¼ of an inch and is made from a semi-hard rubber type polymeric material such as polypropylene. The semi-hard rubber type material provides sufficient protection to the user's hand 20 yet provides sufficient flexibility to enable the user to securely grasp the article of food 30 by compression of fingers 24 and thumb 26 on the walls 14 and 16 respectively. The user is thereby able to secure and safely cut the article of food 30.

FIG. 2 is a perspective view showing the hand held food holding device 10 of FIGS. 1A and 1B more clearly. As depicted in FIG. 2, the hand held food holding device 10 has generally a front section 40 and a rear section 42. An outwardly turned flange 44 is located at the front section 40 of the hand held food holding device 10 and continues along a top portion 46 of the walls 14 and 16 ending at the rear section 42 of the top portion 46. A downwardly turned lip 48 is also located on the hand held food holding device 10 at the rear section 42 of the base 12. The flange 44 and lip 48 enable the user to grasp securely the hand held food holding device 10 to prevent slippage of the device during the cutting motion. They also provide protection to the user's fingers 24, thumb 26 and palm 22 from the knife 32 during the cutting motion. In a preferred embodiment, the flange 44 extends outward approximately ⅝ of an inch from the walls 14 and 16 while the lip 48 extends downward approximately 1 inch from the base 12.

In a preferred embodiment, a series of vertical ribs 50 protrude from an inner surface of the walls 14 and 16. As depicted in FIG. 2, only the vertical ribs 50 on the inner surface of the wall 16 are shown. Also, a series of vertical depressions 52 are located on an outer surface of the walls 14 and 16. Again as depicted in FIG. 2, only the vertical depressions 52 on the outer surface of the wall 14 are shown. The vertical ribs 50 enable the user to hold the article of food 30 more securely, while the vertical depressions 52 aid to prevent the hand held food holding device 10 from slipping or sliding in the user's hand 20 during the cutting motion.

Figure 3:
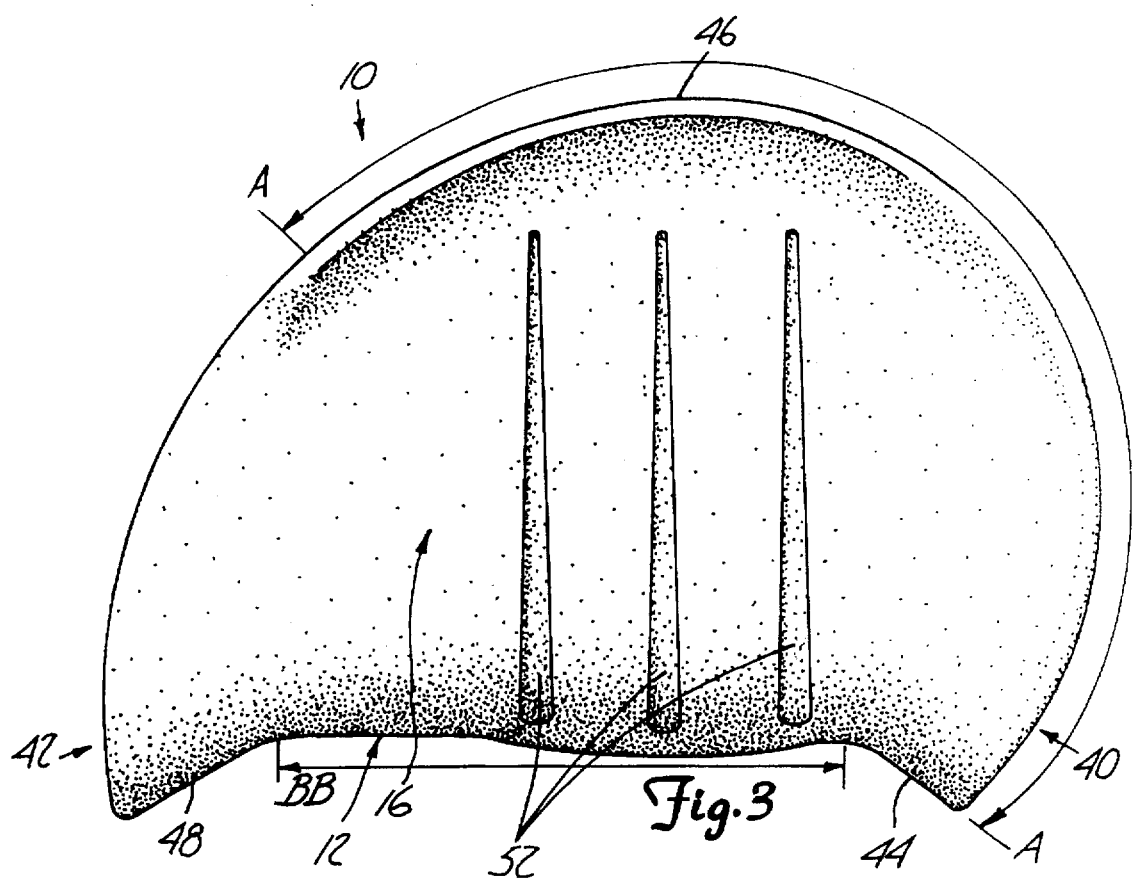
FIG. 3 is a side view of the hand held food holding device of FIG. 1.

FIG. 3 is a side view of the hand held food holding device 10. As depicted, the area of the device that the flange 44 runs along is more clearly delineated as the area marked AA. The lip 48 is also shown more clearly illustrating its outward extension from the base 12. In a preferred embodiment, the height of the walls 14 and 16 from the base 12 to the top portion 46 of the walls 14 and 16 is approximately 4 inches at its highest point. This height allows the fingers 24 and thumb 26 to be protected by the flange 44.

In a preferred embodiment, the length of the base of the hand held food holding device 10 is 3½ inches. This length is defined by the area of the base 12 between the flange 44 and the lip 48 and is depicted by area BB in FIG. 3. The length is established so that the device sits comfortably in the hand 20 of the user. Preferably, the flange 44 and the lip 48 extend outwardly from the U-shaped member as depicted in FIG. 3 to protect the user's anatomical snuffbox (the fleshy area of skin between the thumb and index finger) and heel of the user's hand, respectively.

Figure 4:
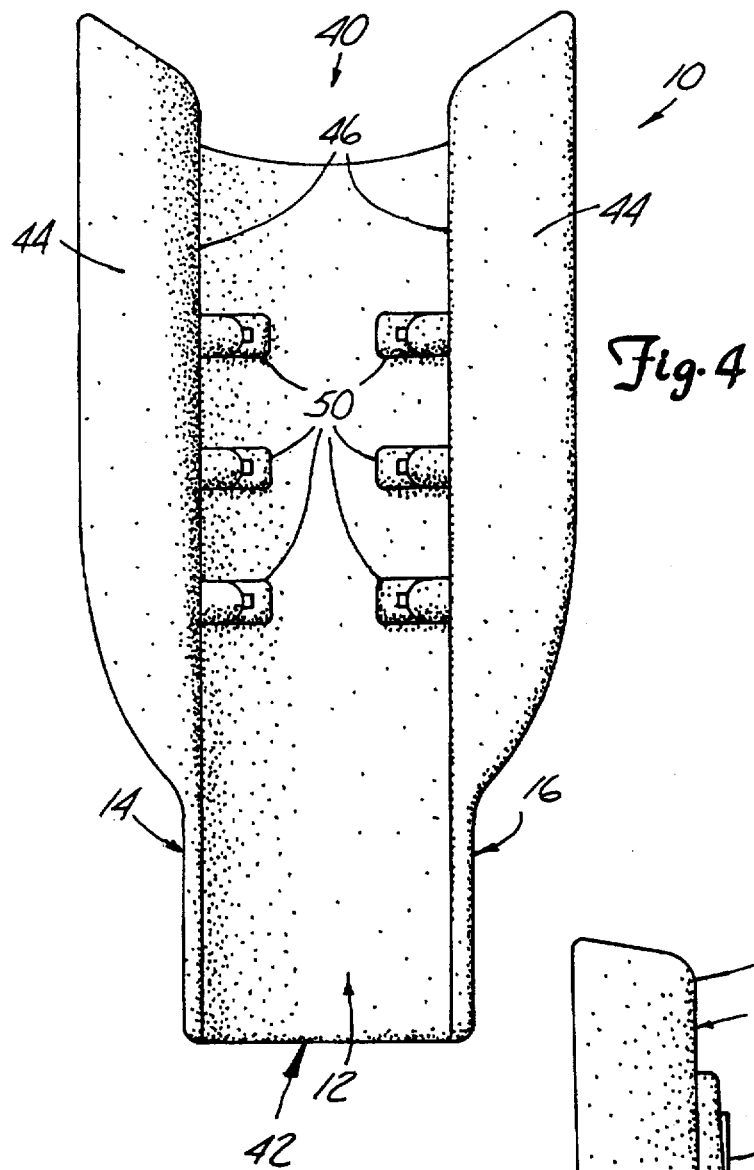
FIG. 4 is a top view of the hand held food holding device of FIG. 1.

FIG. 4 is a top view of the hand held food holding device 10. The vertical ribs 50 which protrude from the inner surface of the walls 14 and 16 are more clearly depicted as is the flange 44 along the top portion 46 of the walls 14 and 16. In a preferred embodiment, the ribs protrude approximately ¼ of an inch from the inner surface of the walls 14 and 16.

Figure 5:
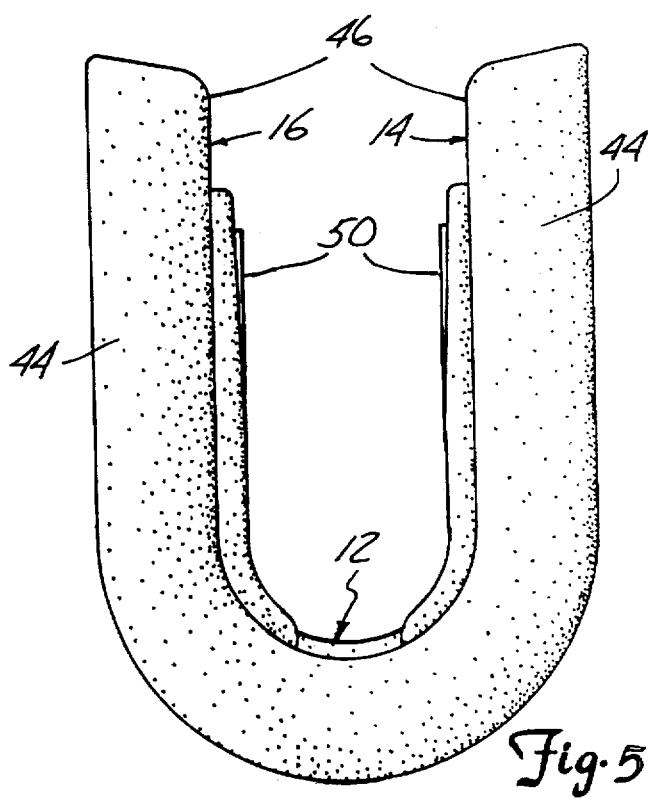
FIG. 5 is a front view of the hand held food holding device of FIG. 1.

FIG. 5 is a front end view of the hand held food holding device 10; the "front end" being the end of the device 10 which faces away from the user. This view shows more clearly that the flange 44 continues around the front end of the hand held food holding device 10 protecting the anatomical snuffbox of the user during use. The vertical ribs 50 are also shown protruding from the inner surfaces of the walls 14 and 16.

Figure 6:
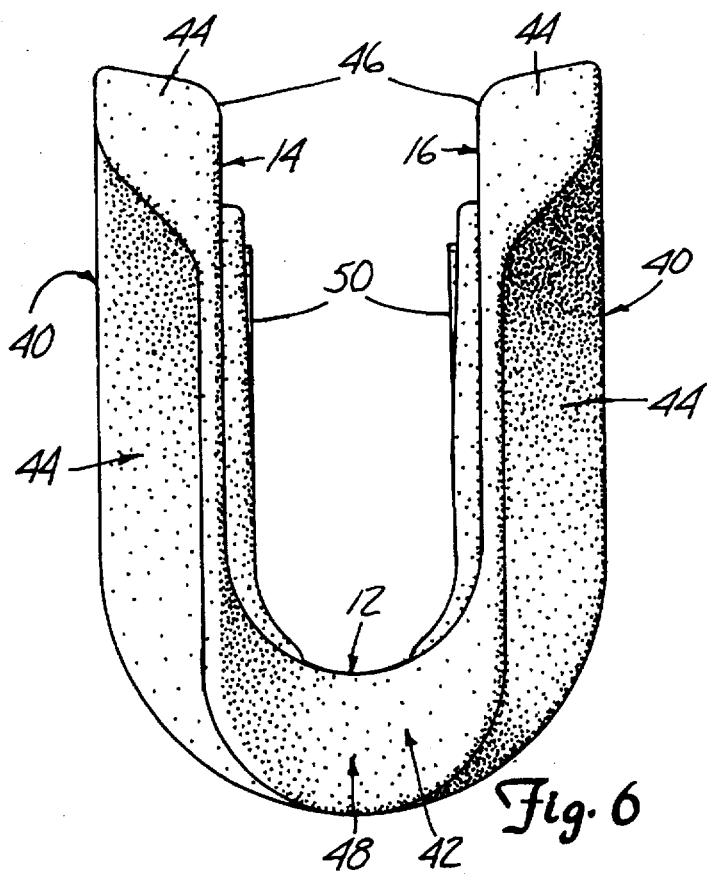
FIG. 6 is a rear view of the hand held food holding device of FIG. 1.

FIG. 6 is a rear view of the hand held food holding device 10. This view depicts the lip 48 located at the rear section 42 of the base 12 which protects the heel of the user's hand. Also depicted is the flange 44 located at the rear of the top portion 46 of the walls 14 and 16, as well as the back side of the flange 44 located at the front section 40 of the hand held food holding device 10.

Figure 7:
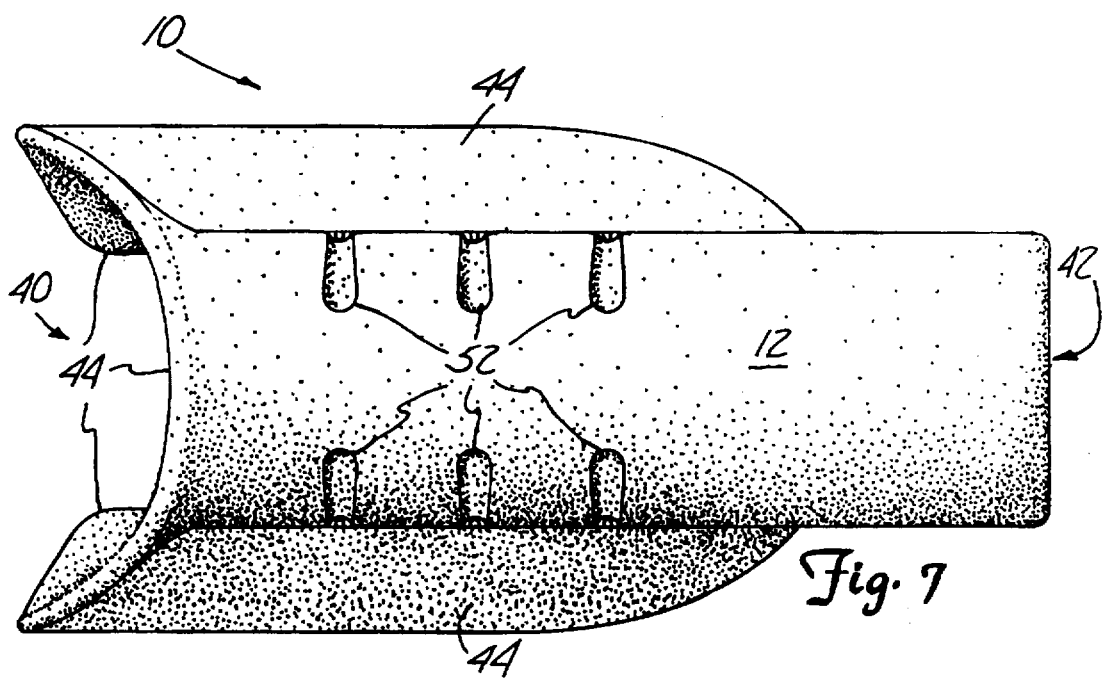
FIG. 7 is a bottom view of the hand held food holding device of FIG. 1.

A bottom view illustrating the width of the hand held food holding device 10 is depicted in FIG. 7. In a preferred embodiment, the width of the device defined by the width of base 12 is approximately 1½ inches. This width allows accommodation of most foods the user is likely to cut while holding the article of food in their hand. Additionally, because the device is made from flexible resilient material, the walls 14 and 16 are able to expand and secure articles of foods with a width greater than the width of the base. However, the width of the base could be increased or decreased to accommodate different types or shapes of food articles as desired.

Figure 8:
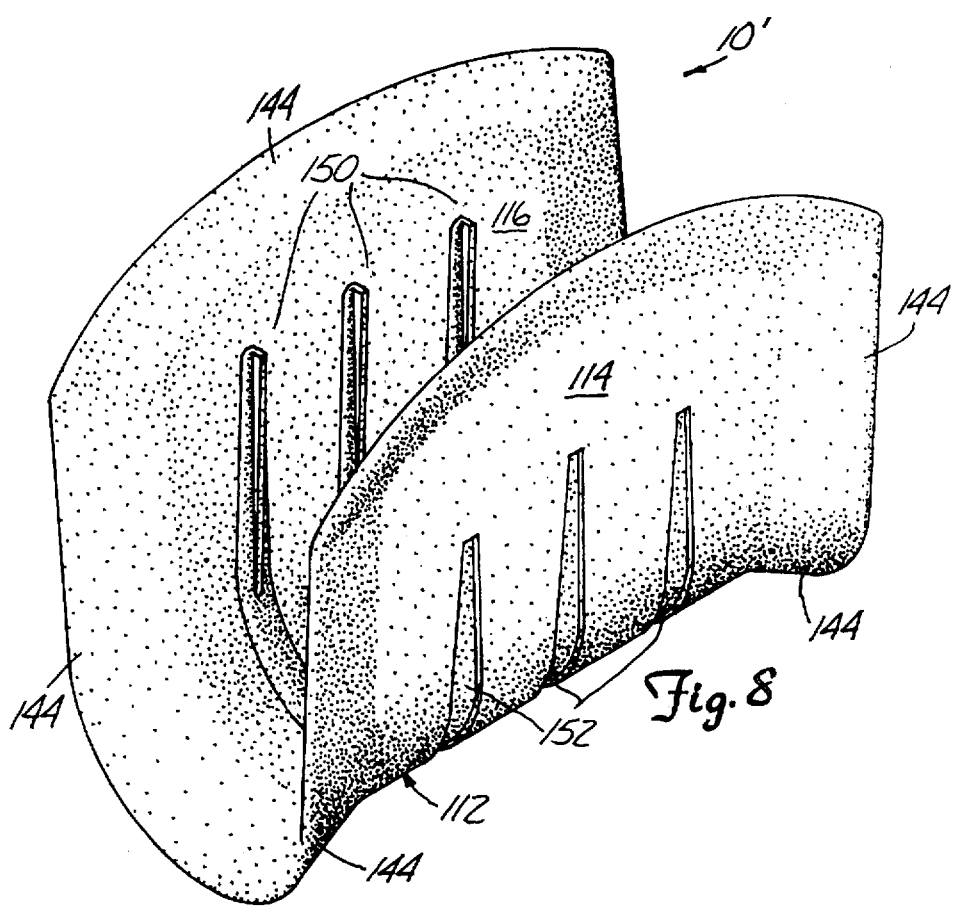
FIG. 8 is a perspective view of a second embodiment of the hand held food holding device of the present invention.

FIG. 8 is a perspective view of a second embodiment of the hand held food holding device 10'. Similar to the first embodiment of the device, the second embodiment is also symmetrical from side to side. However, unlike the first embodiment, the second embodiment is also symmetrical from end to end.

The hand held food holding device 10' of the second embodiment incorporates a base 112, a first wall 114, and a second wall 116. The walls 114 and 116 are connected to the base 112 and extend upwardly therefrom forming a symmetrical U-shaped member. An outwardly turned flange 144 is located along an outer edge of the base 112 and the walls 114 and 116. When the device is placed in the palm of a user, the flange 144 of the second embodiment performs the protection function of both the flange 44 and the lip 48 of the first embodiment.

Figure 9:
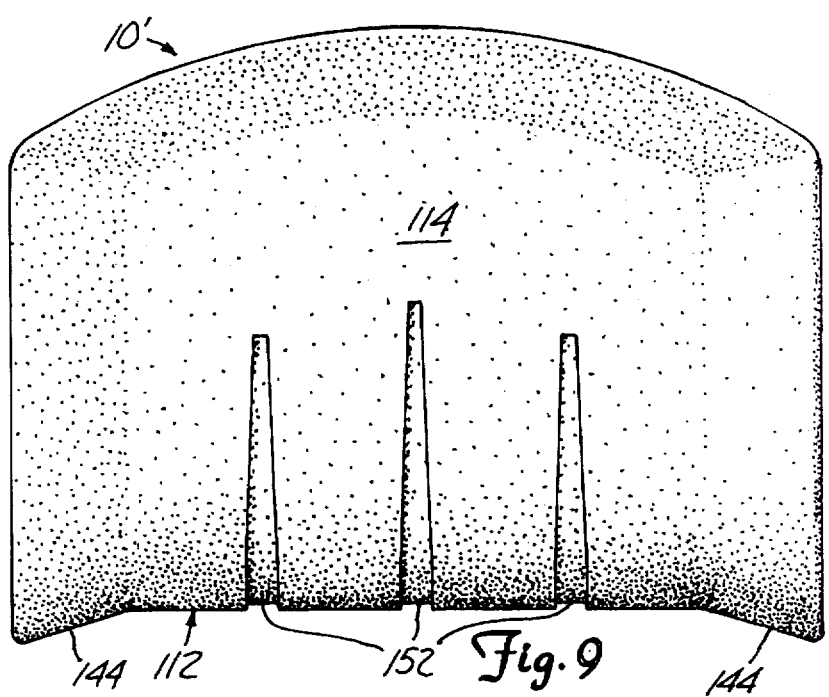
FIG. 9 is a side view of the hand held food holding device of FIG. 8.

Vertical ribs 150 protrude from an inner surface of the walls 114 and 116. As depicted in FIG. 8, only the vertical ribs 150 on the wall 116 are shown. Vertical depressions 152 are located along an outer surface of the walls 114 and 116. As depicted in FIG. 8, only the vertical depressions 152 on the wall 114 are shown. A side view illustrating the symmetry of the alternative embodiment of the hand held food holding device 10' from side to side and end to end is depicted in FIG. 9.

The hand held food holding device of the present invention allows a user to easily and safely cut various articles of food with a knife while the user holds those articles of food in their hand. Being constructed from flexible resilient material, the hand held food holding device is not only lightweight, but is also easy to use, maintain and store. Due to the hand held nature of the device, it does not require a level surface for operation and is less clumsy than other known devices affording the added advantage of being portable.

Although the present invention has been described with reference to preferred embodiments, workers skilled in the art will recognize that changes may be made in form and detail without departing from the scope and spirit of the invention. Examples of these changes could be to vary the type of material used to form the device, as well as vary the thickness of the material. The width of the base can also be increased or decreased to accommodate various types of foods. The height of the walls can also be varied to fit various sizes of hands or types of food. The dimension or location of the flange and lip can also be altered to provide greater or less protection. The vertical ribs and vertical depressions can also vary in number and take the form of a different shape, direction or dimension. Furthermore, the vertical depressions can become vertical protrusions from the outer surface of the walls 14 and 16. With this device, a user is now able to safely use a knife to cut articles of food that are held in the user's hand.

What is claimed is:

1. A hand held food holding device to secure articles of food for cutting or slicing, the device comprising:
    a base which conforms to a hand of a user, wherein the base is a continuous surface having two sides and two ends;
    a first wall having a bottom and a top with an inner and an outer continuous surface of flexible resilient material, wherein the bottom of the wall contacts and extends upwardly from one side of the base;
    a second wall having a bottom and a top with an inner and an outer continuous surface of flexible resilient material, wherein the bottom of the wall contacts and extends upwardly from an opposing side of the base in relation to the first wall, such that the first and second walls inner surfaces are opposed; and
    means for protecting the hand of the user in which the device is placed from injury during a cutting or slicing operation.

2. The device of claim 1, wherein the base and walls comprise a single piece of flexible resilient material.

3. The device of claim 1, wherein the means for protecting the hand of the user comprises an outwardly turned flange.

4. The flange of claim 3, wherein the flange is located along a first end of the device and continues along the top of the walls.

5. The flange of claim 3, wherein the flange is located along an outer edge of the device.

6. The device of claim 1, wherein the means for protecting the hand of the user comprises a downwardly turned lip along a second end of the base.

7. The device of claim 1, wherein a series of ribs protrude from the inner surface of the walls and a series of depressions exist opposite the ribs on the outer surface of the walls from the top to the bottom of the walls.

8. The device of claim 1, wherein the device is symmetrical about a plane perpendicular to the base that intersects and cuts the device in two equal halves from one end of the base to the other end of the base.

9. The device of claim 1, wherein the device is symmetrical about a plane perpendicular to the base that intersects the device into two equal halves from one side of the base to the other side of the base.

10. A hand held food holding device to protect a user's hand and secure articles of food for cutting or slicing the device comprising a U-shaped member for resting in the user's hand and forming an open-ended trough defined by two opposed facing walls connected to a base, wherein the base is shaped to sit in a palm of the user's hand while the first wall contacts fingers of the user's hand and the second wall contacts a thumb of the user's hand, such that the device can receive and secure the article of food within the area defined by the two walls and base and the user's hand is protected from injury during a cutting operation by the two walls, the base and an outwardly turned flange along a portion of the walls and along the base.

11. The device of claim 10, wherein the U-shaped member comprises a single piece of flexible resilient material.

12. The device of claim 10 wherein an outwardly turned flange is located along a first open end of the trough and continues across a top of the trough.

13. The device of claim 10, wherein a downwardly turned lip is located along the base of a second open end of the trough.

14. The device of claim 10, wherein an outwardly turned flange is located along an outer edge of the U-shaped member.

15. The device of claim 10, wherein a series of ribs protrude from an inner surface of the opposed facing walls from the top to the bottom of the walls.

16. The device of claim 10, wherein a series of depression exist on an outer surface of the opposed facing walls from the top to the bottom of the walls.

17. The device of claim 10, wherein the device is symmetrical about a plane perpendicular to the base that intersects and cuts the device in two equal halves from one end of the base to the other end of the base.

18. The device of claim 10, wherein the device is symmetrical about a plane perpendicular to the base that intersects the device into two equal halves from one side of the base to the other side of the base.

19. A hand held food holding device to secure articles of food for cutting or slicing, the device comprising:
    a base forming a continuous surface having two sides with a front end and a back end;
    a first wall having a bottom and a top with a front end and a rear end forming a continuous surface, wherein the bottom of the wall contacts and extends upwardly from one side of the base;
    a second wall having a bottom and a top with a front end and a rear end forming a continuous surface, wherein the bottom of the wall contacts and extends upwardly from an opposing side of the base in relation to the first wall, such that the first and second walls front and rear ends are opposed;

an outwardly turned flange along the front end of the base which continues along the front end of the walls and the top of the walls; and a downwardly turned lip along the back end of the base.

20. The device of claim 19 wherein the base, walls, flange and lip comprise a single piece of flexible resilient material.

21. The device of claim 19, wherein the ends of the base and the walls form a first and second end section which are both open.

22. The device of claim 19, wherein the device is symmetrical about a plane perpendicular to the base that intersects and cuts the device in two equal halves from the front end of the base to the back end of the base.

23. A method for safely cutting or slicing an article of food using a U-shaped hand held food holding device, the method including:

placing the hand held food holding device into a user's hand so that a base of the U-shaped device rests in a palm of the user's hand with two opposing walls extending upwards from the base, allowing fingers of the user to contact one wall and a thumb of the user to contact the opposing wall, wherein the fingers and the thumb of the user's hand holding the device are protected from injury during a cutting operation by a flange which extends out from the walls along their top and continues down their side and along one end of the base;

placing the article of food to be cut or sliced into the U-shaped member;

cutting the article of food secured in the device with a knife from the top of the U-shaped member toward the base along an axis substantially perpendicular to the base and between the walls; and removing the cut or sliced portions of the article of food from the U-shaped device once the cut or slice is completed.

24. The method of claim 23 and further comprising securing the article of food in the U-shaped member during cutting by compressing the walls of the U-shaped member.

25. A hand held food holding device to secure articles of food for cutting or slicing, the device comprising:

a base which conforms to a hand of the user, wherein the base has two sides and two ends;

a first wall having a bottom and a top with an inner and an outer surface wherein the bottom of the wall contacts and extends upwardly from one side of the base;

a second wall having a bottom and a top with an inner and an outer surface, wherein the bottom of the wall contacts and extends upwardly from an opposing side of the base in relation to the first wall, such that the first and second walls inner surfaces are opposed; and an outwardly turned flange along the ends of the base and a portion of the walls for protecting the hand of the user in which the device is placed from injury during a cutting operation.

\* \* \* \* \*